United States Patent
Quinquis

(10) Patent No.: US 9,813,689 B2
(45) Date of Patent: Nov. 7, 2017

(54) METHOD FOR ACCELERATED RESTITUTION OF AUDIO CONTENT AND ASSOCIATED DEVICE

(71) Applicant: THOMSON LICENSING, Issy de Moulineaux (FR)

(72) Inventor: Cyril Quinquis, Melesse (FR)

(73) Assignee: Thomson Licensing (FR)

(*) Notice: Subject to any disclaimer, the term of this patent is extended or adjusted under 35 U.S.C. 154(b) by 88 days.

(21) Appl. No.: 14/571,458

(22) Filed: Dec. 16, 2014

(65) Prior Publication Data
US 2015/0181190 A1 Jun. 25, 2015

(30) Foreign Application Priority Data
Dec. 16, 2013 (FR) .................... 13 62639

(51) Int. Cl.
| | | |
|---|---|---|
| *H04N 5/92* | (2006.01) | |
| *H04N 5/89* | (2006.01) | |
| *H04N 9/80* | (2006.01) | |
| *H04N 5/93* | (2006.01) | |
| *G11B 27/00* | (2006.01) | |
| *H04N 9/806* | (2006.01) | |
| *H04N 9/804* | (2006.01) | |
| *H04N 5/85* | (2006.01) | |

(Continued)

(52) U.S. Cl.
CPC .......... *H04N 9/806* (2013.01); *G10L 21/043* (2013.01); *G11B 27/005* (2013.01); *G11B 27/105* (2013.01); *H04N 5/85* (2013.01); *H04N 9/8042* (2013.01)

(58) Field of Classification Search
CPC .. H04N 5/92; H04N 5/89; H04N 9/80; H04N 5/93; H04N 5/78; G11B 27/00; G06F 17/00

USPC ....... 386/326, 338, 339, 340, 241, 278, 285, 386/314, 318; 700/90, 94
See application file for complete search history.

(56) References Cited

U.S. PATENT DOCUMENTS 5,623,344 A * 4/1997 Lane .................. G11B 15/1875
348/E5.007
6,185,527 B1 2/2001 Petkovic et al.
(Continued)

FOREIGN PATENT DOCUMENTS

WO 200013136 3/2000

OTHER PUBLICATIONS

Zhang et al, "Adaptive music resizing with stretching cropping and insertion", vol. 19, n°4, pp. 359-380.
(Continued)

*Primary Examiner* — Daquan Zhao
(74) *Attorney, Agent, or Firm* — Jack Schwartz & Associates, PLLC

(57) ABSTRACT

The present invention relates to an audio content restitution method in a receiver of audio and/or audiovisual content, the receiver being adapted to the restitution of the audio content, the audio content being received encoded and containing a succession of frames of audio samples and pointer type information on at least one portion of the audio samples of the frames.

According to a particular embodiment, the audio content restitution method comprises:
 a selection of audio samples from the frames, the selected audio samples being identified from the pointer type information;
 a restitution of the only samples selected.

20 Claims, 4 Drawing Sheets

(51) Int. Cl.
*G11B 27/10* (2006.01)
*G10L 21/043* (2013.01)
*H04N 5/78* (2006.01)
*G06F 17/00* (2006.01)

(56) References Cited

U.S. PATENT DOCUMENTS

| | | | |
|---|---|---|---|
| 6,252,919 B1 * | 6/2001 | Lin | G10L 21/04 |
| | | | 375/355 |
| 6,324,337 B1 | 11/2001 | Goldwasser | |
| 6,442,517 B1 * | 8/2002 | Miller | G10L 19/167 |
| | | | 370/493 |
| 6,868,224 B1 | 3/2005 | Birmingham et al. | |
| 7,506,356 B2 | 3/2009 | Gupta et al. | |
| 8,069,037 B2 | 11/2011 | Singhai | |
| 8,428,443 B2 | 4/2013 | Ljolje et al. | |
| 2003/0009248 A1 * | 1/2003 | Wiser | G11B 20/10527 |
| | | | 700/94 |
| 2004/0267524 A1 * | 12/2004 | Boillot | G10L 21/04 |
| | | | 704/205 |
| 2008/0131075 A1 | 6/2008 | Pontual et al. | |
| 2011/0268428 A1 | 11/2011 | Chen et al. | |
| 2011/0302238 A1 | 12/2011 | Sood et al. | |

OTHER PUBLICATIONS

Arons, "Interactively skimming recorded speech", PhD Dissertation, Massachusetts Institute of Technology;Feb. 1, 1994.
Chu et al, "Energy-based non uniform time-scale compression of audio signals", IEEE Transactions on consumer electronics, IEEE Service Center, New-York, US, vol. 49, n°1, pp. 183-187
Search Report Dated Sep. 17, 2014.

* cited by examiner

METHOD FOR ACCELERATED RESTITUTION OF AUDIO CONTENT AND ASSOCIATED DEVICE

This application claims the benefit, under 35 U.S.C. §119 of French Patent Application No. 1362639, filed Dec. 16, 2013.

1. FIELD OF THE PRESENT DISCLOSURE

The present disclosure relates to the field of restitution of items of audiovisual content and more specifically to the restitution of an audio component at an accelerated speed.

2. BACKGROUND ART

Many devices for the reception and restitution of audiovisual content are configured to enable the local recording to an item of audiovisual content and its subsequent restitution at reception. These devices are frequently equipped with recording modules, such as hard drives, or flash memory modules featuring read and write functions equivalent to those of a hard drive storage unit.

The users of such a device can then view an item of recorded audiovisual content at any time whenever they like and have time.

Sometimes a user thinks he has time to view an item of audiovisual content, begins to watch it, and then if there is not enough time, wants to watch it in an accelerated manner.

Methods exist that allow content to be viewed in an accelerated manner, without degrading the restitution quality, that is to say without the user perceiving an accelerated display effect and without the audio component being deformed by the restitution occurring in a shorter time period than its native duration.

These techniques remove some images, cleverly distributed over time with regard to the video, and use techniques specific to accelerated audio restitution with regard to the audio.

Today it is possible, with some reception, recording, and restitution equipment, to view an hour of audiovisual content in 40 minutes, for example.

With regard to the rapid restitution of audio, that is to say in a shorter duration than its nominal duration, it is possible to categorize the techniques used into three ways to operate.

A first technique consists of reading the audio component of a content at the same speed at the video component, which generates a tone distortion relative to the encoded audio component. The acceleration shifts the audio restitution to a higher pitch.

This first technique is deemed to be unacceptable from a business perspective because it leads to an overly degraded quality of restitution.

A second technique consists of applying processing to the encoded audio component, such that, during the quick restitution, there is no alteration in the tone. This is the case, for example, when the audio component is restituted more quickly and frequency transpositions are applied to the audio samples.

This second technique produces acceptable results in terms of audio restitution quality, but because of all the processing to be carried out, it requires substantial processor and memory resources, which is disadvantageous from the viewpoint of system load, particularly in a real-time multitasking environment.

A third technique consists of accelerating the audio restitution, while removing pieces of the audio frames that make up the audio components. This method corresponds, for example, to the known processing that uses the WSOLA ("Waveform-similarity-based Synchronised OverLap-Add") algorithm.

This third technique achieves satisfactory results, like the previous one, but it still requires lots of resources when the reception and restitution device operates at the limit of its processor and memory resources.

3. SUMMARY

The present disclosure improves upon the prior art by proposing a method for accelerating the restitution of an item of audiovisual content, that is to say, within a shorter time than its nominal duration, and particularly an accelerated audio restitution method performing certain processing required at the encoding level rather than in reception and restitution devices.

The present disclosure relates notably to an audio content restitution method in a receiver (PVR) of audio and/or audiovisual content, said receiver being adapted to the restitution of said audio content, said audio content being received encoded and containing a succession of frames of audio samples and pointer type information on at least one portion of the audio samples of said frames.

According to one particular embodiment, said method comprises:
  a selection of audio samples from said frames, said selected audio samples being identified from said pointer type information;
  a restitution of said only samples selected.

Depending on the embodiments, this may be the restitution of an item of audio or audiovisual content stored on a medium, including storage that is external to the receiver device, such as a digital audio or video drive, for example, or audio or video content received in a stream from a communications network.

According to one particular embodiment, said receiver is adapted to the restitution of said audio content at a nominal restitution speed and at least a restitution speed greater than said nominal restitution speed, and in that said restitution of said only samples selected is carried out with one of said at least one restitution speeds greater than said nominal value.

In the following paragraphs, pointer type information, or pointers, is understood to mean any information that is useful in identifying one item among a plurality of items. Thus, a pointer also corresponds to the term "marker" and may be a rank, a position, an index, an address, or a temporal reference, such as non-restrictive.

The terms "accelerated restitution duration relative to the nominal restitution duration" here mean that the total duration of audio content restitution is shorter according to some embodiments of the method of restitution of this disclosure than the native restitution speed for audio content. One minute of audio content can thus be restituted in 40 to 50 seconds, for example, according to some embodiments of the method of restitution of the present disclosure.

Advantageously, this makes it possible to reduce the restitution duration of an item of audio or audiovisual content while preserving the original tone. Thus, a user can watch an item of received audiovisual content, which has been restituted according to the method, in less time than its nominal duration, all without noticing a deformation in the tone, such as, for example, a shift to a higher register.

According to one particular embodiment, said pointer type information is contained in header packets, each of said header packets being associated with one of said frames.

According to one particular embodiment, said pointer type information contains information identifying the start of a series of samples to be restituted or truncated and/or information identifying the end of a series of samples to be restituted or truncated.

According to one particular embodiment, the method of restitution further comprises a mixing of at least one first audio sample with at least one second audio sample, said at least one first and said at least one second audio samples being selected from said pointer type information on the audio samples.

According to one particular embodiment, said mixing of said first and second samples is carried out by calculating an average value of said first and second samples.

According to one particular embodiment, said pointer type information on the audio samples comprises pointers related to the samples to be restituted or truncated and pointers related to the selected samples to be mixed.

According to one particular embodiment said pointer type information contains information identifying the start of a series of samples to be mixed and/or information identifying the end of a series of samples to be mixed.

According to one particular embodiment, said header packets each contain several sets of pointer type information, each of said sets being respectively associated with one possible value of said restitution speed greater than said nominal restitution speed.

According to one particular embodiment, the method of restitution it uses an algorithm for modifying a succession of audio samples based on the WSOLA method.

Although not explicitly described, the embodiments presented can be implemented using any combination or subcombination. For example, one embodiment of the method of restitution in which the header packets each include several pieces of pointer type information associated with several possible restitution speed values greater than the nominal restitution speed, respectively, may be combined with an embodiment in which the restitution method comprises a mixing at least one first audio sample with at least one second audio sample, the at least one first and at least one second audio samples being selected from pointer type information on audio samples.

Other embodiments, easily conceivable by those skilled in the art on reading the present description, are also included within the scope of the present disclosure.

Specifically, this disclosure is not limited to the restitution of a succession of audio samples encoded based on the WSOLA method.

According to yet another aspect, this disclosure also relates to receiver-decoder of audiovisual and/or audio content comprising at least one processor configured for a restitution of an item of audio content, said audio content being received encoded and comprising a succession of frames of audio samples and pointer type information on at least a portion of the audio samples of said frames.

According to one particular embodiment, said at least one processor configured for:
- a selection of audio samples from said frames, said selected audio samples being identified from said pointer type information,
- a restitution of said only samples selected.

Although not explicitly described, said receiver-decoder can be configured to implement the restitution method of this disclosure in any one of its embodiments.

According to yet another aspect, the present disclosure also relates to a method for encoding audio content, said encoded audio content and including a succession of frames of audio samples and pointer type information on at least one portion of the audio samples of said frames.

According to one particular embodiment, said method for encoding comprises a selection of audio samples to be restituted, and an identification of said selected audio samples by said pointer type information.

According to one embodiment of the present disclosure, the method for encoding an algorithm for modifying a succession of audio samples based on the WSOLA method.

Although not explicitly described, said encoding method can be implemented in embodiments that are compatible with at least one of the embodiments of the restitution method described above.

According to yet another aspect, the present disclosure also relates to an encoder of audio and/or audiovisual content, including at least one processor configured for encoding an item of audio content, said encoded audio content including a succession of frames of audio samples and pointer type information on at least one portion of audio samples of said frames. According to one particular embodiment, said at least one processor is configured for a selection of audio samples to be restituted, and for an identification of said selected audio samples by said pointer type information.

Although not explicitly described, said encoder can be configured to implement the encoding method of this disclosure in any one of its embodiments.

According to yet another aspect, the present disclosure relates to a computer program product comprising program code instructions for executing the above restitution method, in any one of the aforementioned embodiments, when said program is executed by a computer.

According to yet another aspect, the present disclosure relates to a computer program product comprising program code instructions for executing the above encoding method, in any one of the aforementioned embodiments, when said program is executed by a computer.

According to yet another aspect, the present disclosure relates to a signal carrying a stream comprising a succession of audio sample frames and pointer type information on at least one portion of the audio samples of said frames. According to one particular embodiment, said signal contains data encoded according to one of the particular embodiments of the encoding method that is the subject of this disclosure.

According to yet another aspect, the present disclosure relates to a computer-readable storage medium on which is saved a computer program comprising program code instructions for executing the restitution method of the present disclosure or for executing the encoding method of the present disclosure, in any one of their aforementioned embodiments, when said program is executed by a computer.

Such a computer-readable storage medium can take the form of a computer program product loaded onto at least one computer-readable storage medium comprising computer-readable and computer-executable program code instructions.

Thus, in the present patent application, a computer-readable storage medium is considered as being a non-transitory storage medium having the intrinsic capacity to store information and the intrinsic capacity to enable a restitution of the information which it stores.

A computer-readable storage medium can be for example, but not only, a system, a device or an item of equipment which is electronic, magnetic, optical, electromagnetic or infra-red, made of semiconductors or implements a combination of the techniques previously mentioned. It should be underlined that the following elements, which provide more specific examples of computer-readable storage media to which the principles of the present disclosure can be applied, are essentially mentioned for illustrative purposes and in no case constitute an exhaustive list, as will be easily interpreted by those skilled in the art: a portable computer diskette, a hardware disc, a memory of ROM (Read Only Memory) type, an erasable memory of EPROM (Erasable Programmable Read Only Memory) type or flash memory, a portable compact disc comprising a ROM memory (CD ROM), an item of optical storage equipment, an item of magnetic storage equipment, or any suitable combination of the preceding elements.

As would be easily understandable for those skilled in the art, according to variants, the aspects of the present invention can be implemented by a device, by a method, or by a computer-readable storage medium. Thus, aspects of the present invention can be implements in certain embodiments in the form of entirely hardware components (for example an electronic component or an electronic card equipped with components), or in the form of entirely software components (including for example firmware components, a "resident" software program, microcode, etc.). Other embodiments can implement both hardware components and software components. Moreover, these hardware or software components can be implemented in a same physical item of equipment.

In the present document, the term "module" will generally designate a component which can correspond either to a hardware component or to a software component. Moreover, aspects of the present invention can be implemented in the form of a computer-readable storage medium. Any combination of one or more computer-readable storage media can be used.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

In FIGS. 1 to 6, the modules shown are functional units that may or may not correspond to physically distinguishable units. For example, these modules or some of them are grouped together in a single component, or constituted of functions of the same software. On the contrary, according to other embodiments, some modules are composed of separate physical entities.

Figure 1:
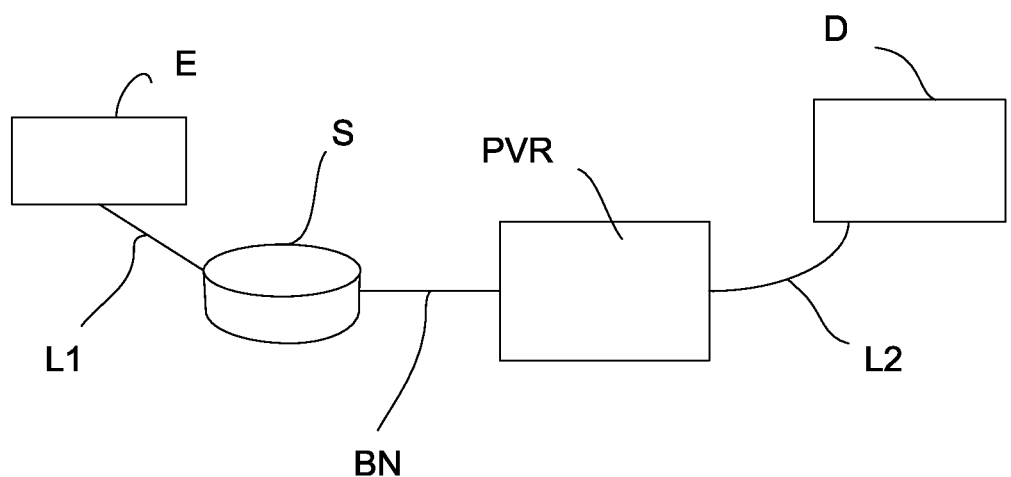
FIG. 1 illustrates a system for transmitting audiovisual content between an encoder, implementing the encoding method according to one particular embodiment, and a receiver-recorder device implementing the restitution method according to one particular embodiment.

FIG. 1 illustrates a system for transmitting audiovisual content between an encoder E, implementing the encoding method according to one particular and non-limiting embodiment of the present disclosure, and a receiver-recorder device PVR implementing the restitution method according to one particular and non-limiting embodiment of the present disclosure.

According to one embodiment of the present disclosure, the encoder E receives signals from one or more audiovisual sources and encodes the signals received in one or more digital streams transmitted to a server S by means of a transmission link L1. The digital streams corresponding to one or more items of audiovisual content are stored on the audiovisual content server S, in the form of files.

In other embodiments, the encoded streams can be stored on an external medium, such as a USB drive, an external hard drive or a compact disc (CD). The audiovisual content receiver-recorder device PVR is connected to the server S by means of a broadband network BN. The receiver-recorder PVR is configured to be able to select and receive audiovisual content available on the server S, under the control of a user. The receiver-recorder PVR is further connected to a restitution device D, by means of a link L2. The restitution device D is configured to allow the display of a video component of an item of audiovisual content and the audio restitution of an audio component of an item of audiovisual content. The device D is, for example, a television set. The link L2 is, for example, a digital transmission link that is compatible with the standard HDMI ("High Definition Multimedia Interface") for connecting equipment. The receiver-decoder device PVR comprises a storage unit adapted to the local storage of one or more items of audiovisual content received from the server S, allowing the user to view content received after it is received. The receiver-recorder device PVR comprises all of the modules implementing the receiving, demultiplexing, buffering, processing, decoding, and restitution functions specific to a piece of receiver-decoder-recorder equipment, also commonly called a TV decoder, TV recorder or Set-Top Box. The device PVR notably comprises a communication interface configured for the connection to a broadband network via a piece of modem-router equipment, a demultiplexer module, a memory module, a control unit comprising a processor, a random access memory, a non-volatile memory, a decoding module, and an audiovisual content restitution module for after decoding, as well as all related modules and devices, well known to those skilled in the art. These various modules are not described in detail here, their description not being useful to the understanding of the invention. According to variants of the embodiment, the restitution device D may be included in the receiver-recorder device PVR. Both devices PVR and D can be instantiated in the form of a desktop computer, a laptop computer, a television with a recorder, a receiver with a display screen, a radio receiver, a high-fidelity playback channel, or a smartphone, for example.

Figure 2:
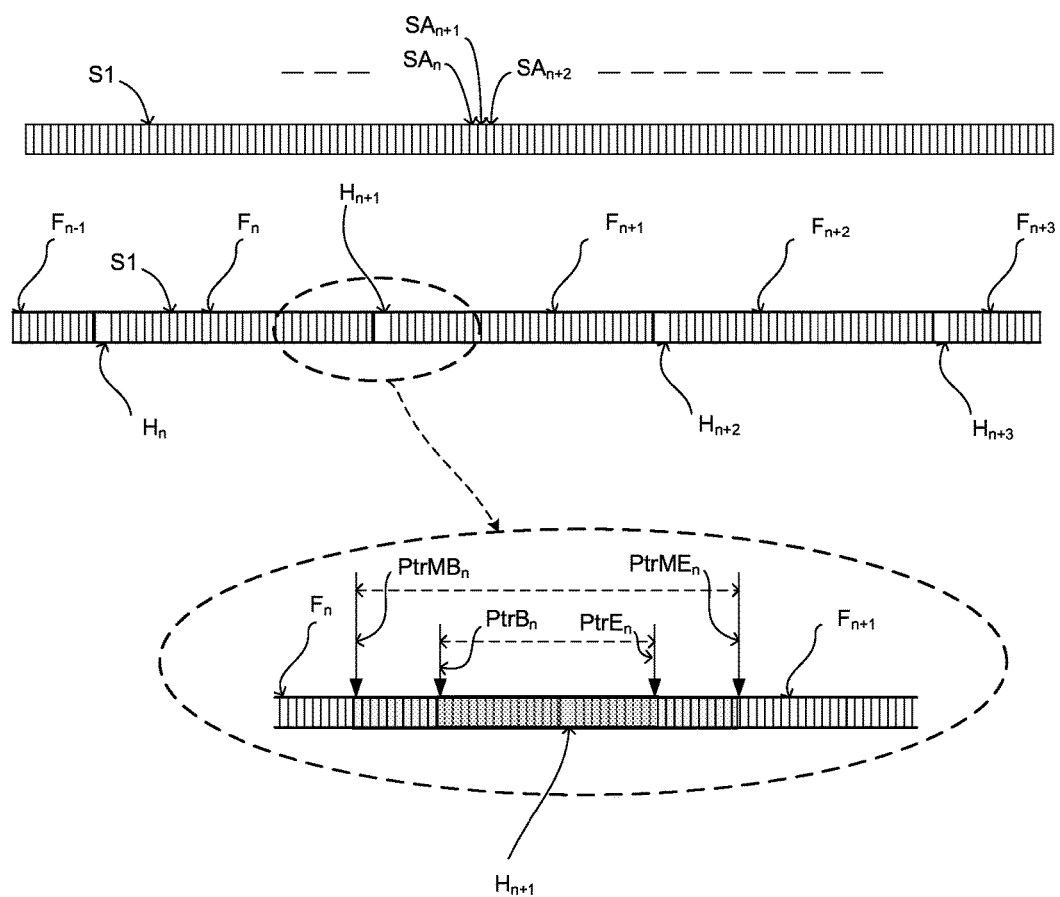
FIG. 2 illustrates a succession of encoded audio frames to be restituted by the receiver-recorder device in FIG. 1 using the restitution method according to one particular embodiment.

FIG. 2 illustrates a succession of encoded audio frames to be restituted by the receiver-recorder device in FIG. 1 using the restitution method according to the present disclosure. According to the preferred embodiment of the present disclosure, the audiovisual contents available on the audiovisual content server S include at least one audio component and one video component. The audio component contains a succession of samples $SA_1$, $SA_2$, $SA_3$, ..., $SA_n$, $SA_{n+1}$, $SA_{n+2}$, ... $SA_{n+i}$, etc., which constitute an audio stream S1. The audio stream S1 is encoded in frame mode, which facilitates transport and processing, specifically enabling sequential processing, frame after frame, of the audio samples $SA_1$, $SA_2$, $SA_3$, ..., $SA_n$, $SA_{n+1}$, $SA_{n+2}$, ... $SA_{n+i}$. The encoding in frame mode of the stream is carried out by the encoder E such that the audio samples $SA_1$, $SA_2$, $SA_3$, ..., $SA_n$, $SA_{n+1}$, $SA_{n+2}$, ... $SA_{n+j}$, are included in successive frames $F_1$, $F_2$, $F_3$, ..., $F_n$, $F_{n+1}$, $F_{n+2}$, ... $F_{n+j}$. Each of the frames $F_1$, $F_2$, $F_3$, ..., $F_n$, $F_{n+1}$, $F_{n+2}$, ... $F_{n+j}$, comprises a header, which contains useful information for processing the frames, such as, for example, a frame identifier, an identifier for the audiovisual program carried by the stream S1, a continuity counter for detecting transmission errors, an indicator of the number of audio samples included in the frame, information related to the encoding of the stream, such as, for example, the audio sampling frequency, the number of audio routes (channels) affected by the stream, the arrangement of the samples in the frames based on the number of audio channels, as an example.

According to one embodiment of the present disclosure, the native stream S1, prior to the insertion of information related to the selection of samples by the encoder E, is encoded according to AC3 Dolby, MPEG-1 Layer 2 or AAC format, or one of their successors, for example.

In some embodiments, the pointer type information may be carried by frames of a video stream that should be restituted at the same time as the audio stream. In other embodiments, like in the illustrated embodiment, they can be carried by the audio frames themselves.

Thus, cleverly, in the illustrated embodiment, each of the headers themselves contain pointer type information on some audio samples of the current frame and the next frame, enabling the selection, by the receiver-recorder device PVR, of a subset only of the samples for the restitution of the audio component corresponding to the audio stream S1.

According to the embodiment of the present disclosure, some pointers on some audio samples are used to delimit series of samples to be selected from all of the samples carried by the frames, and other pointers are used to delimit series of samples to mix between them.

Advantageously, in the illustrated embodiment, the selection of a subset of audio samples, which corresponds to the omission of a portion of audio samples, reduces the number of samples to be restituted by truncating the start and end of the encoded samples. At least parts of the frames resulting then from the truncation are concatenated by overlapping and mixing, which, together, smooth the effects of the truncation during the restitution of audio content that results from these operations.

The restitution of the audio stream resulting from the truncation and concatenation of selected samples in the truncated frames, at a restitution frequency corresponding to the sampling frequency of the stream during its creation, make it possible to restitute the audio content in less time than its nominal duration. Nominal duration is understood to mean the restitution of the stream in the absence of a selection of a subset of samples.

Cleverly, the received stream comprises information that is useful in the selection of the samples to keep and the samples to mix, in the form of pointers on some samples. The pointers exist in the headers of the frames and are defined relative to an accelerated restitution speed.

Advantageously, the presence of this information in the encoded stream S1 makes it possible to do without the significant resources requires for the selection of samples in the receiver-recorder device PVR. In fact, the implementation of an algorithm to select samples for the accelerated restitution of an item of content, such as is done by the method according to the WSOLA algorithm, for example, requires significant system resources and often constitutes a major overload for the control and processing unit of a receiver-recorder device, such as the equipment PVR.

According to the preferred embodiment of the present disclosure, the header of the frame $F_n$ shown in FIG. 2 contains pointer fields on the samples of frames $F_n$ and $F_{n+1}$. According to the particular embodiment illustrated in FIG. 2, these pointers include the position in the frame of the first sample in a series of samples to be omitted and the position of the last sample in the series of samples to be omitted in the next frame $F_{n+1}$. These pointers are called $PtrB_n$ and $PtrE_n$, respectively. Due to the truncation, and in order to smooth the discontinuity that appears between the last remaining elements of the frame $F_n$ and the first remaining elements of the frame $F_{n+1}$, some remaining elements are mixed together. The mixing is carried out on a number of elements, defined based on an algorithm known to those skilled in the art, such as the WSOLA algorithm, for example. The method for defining the elements delimiting the truncation areas and mixing areas is not described here, since it is not necessary for the understanding of the present disclosure. Thus, according to the particular embodiment illustrated in FIG. 2, the pointers PtrMBn and PtrMEn included in the header of the frame $F_n$ indicate respectively the selected elements (therefore outside of the series of samples to be omitted, delimited by $PtrB_n$ and $PtrE_n$) that need to be mixed to smooth the discontinuity and improve the quality of the restitution at an accelerated speed.

According to the particular embodiment illustrated in FIG. 2, the samples from the frame $F_n$ delimited by the pointers $PtrMB_n$ and $PtrB_n$, respectively, will therefore be mixed in pairs with the selected samples from the frame $F_{n+1}$ delimited by the pointers $PtrE_n$ and $PtrME_n$. The audio stream resulting from the selection of samples then comprises fewer samples because the successive samples between the $PtrB_n$ and $PtrE_n$ pointers are omitted. Advantageously, the restitution of a frequency equal to the sampling frequency allows for the restitution of audio content in less time than its nominal duration. The nominal duration being the restitution duration at the sampling frequency for all the samples in the frames, in the absence of a selection (omission).

According to the illustrated embodiment of FIG. 2, a series of audio samples to be omitted starts in the current Frame $F_n$ and ends in the next frame $F_{n+1}$. In others embodiments, a frame may comprise one or several series of audio samples to be omitted starting and ending in the frame. A frame may also comprise no audio sample to be omitted, or may comprise one or several series of audio samples to be omitted starting and ending in the frame and a series of audio samples to be omitted starting but not ending in the frame (or ending but not starting in the frame). In such an embodiment, pointer type information (relating to samples to be omitted or mixed) to may include the number of the frame comprising the pointed audio sample and the position of the pointed audio sample in the frame it belongs to.

The positions of the samples, respectively indicated by the pointers, depend on the desired restitution speed. Thus, the greater the accelerated restitution speed (respectively the lower the restitution duration) is with regard to the nominal restitution speed, and therefore the nominal duration, the fewer (respectively the greater) the number of selected samples is and the greater (respectively the lower) the number of omitted samples is. It is possible to obtain satisfactory results in terms of restitution quality for an increase in the restitution time of up to 20% more than the nominal speed.

According to one embodiment of the present disclosure, each of the frames contains several sets of pointers, such as described above, respectively associated with several indices (acceleration factors) of restitution speed. Thus, a frame header may contain, for example, the list of truncation and mixing pointers for an accelerated speed with a factor×1.1 and then the list of truncation and mixing pointers for an accelerated speed with a factor×1.2, and so on for factors× 1.3, ×1.4, etc. If multiple sets of pointers are present in a frame header, the control unit of the receiver-recorder PVR that operates the selection of samples takes into account the set of pointers corresponding to the desired acceleration factor and carries out the selection of samples using the set of pointers corresponding to the desired restitution requested by the user.

Depending on the embodiment of the present disclosure, when the frame at rank n+1 $F_{n+1}$ is received, after the frame at rank n is received, the control unit of the receiver-recorder PVR analyses the header content of the frame at rank n $F_n$, specifically by reading the pointers $PtrB_n$ and $PtrE_n$ which identify the limits of the series of samples to be omitted, positioned in frames $F_n$ and $F_{n+1}$, respectively, as well as the pointers $PtrMB_n$ and $PtrME_n$, which identify the limits of the series of samples that must be mixed in order to best limit the effects of the discontinuity due to the truncation of the frames of samples.

After receiving the frames $F_n$ and $F_{n+1}$, and according to a particular non-limiting embodiment of the present disclosure, the samples from the frames $F_n$ from the pointer $PtrE_{n-1}$ to the pointer $PtrB_n$, are recopied to a restitution buffer (buffer memory), then the samples positioned between the pointers $PtrMB_n$ and $PtrB_n$ are successively mixed with the samples positioned between the pointers $PtrE_n$ and PtrMEn, by taking an average of the samples for instance, the values resulting from the mixing being written to the restitution buffer following the previously recopied values (samples). When the limit of the series of samples to be mixed is reached, the recopying of the samples starts at the pointer $PtrME_n$ and continues to the pointer $PtrB_{n+1}$ of the next frame. In parallel to this selection operation, a restitution process, still under the control of the control unit of the device PVR, scans the restitution buffer in order to feed input to an audio decoding module and restitute the audio stream resulting from the selection of samples. Of course, if the header of the frames contains several sets of pointers corresponding to several possible restitution speeds, the control unit reads the pointers that correspond to the defined restitution speed. This speed is selected by the user seeking to view audiovisual content corresponding to the audio stream S1, by means of a user interface that has been configured to do this.

Figure 3:
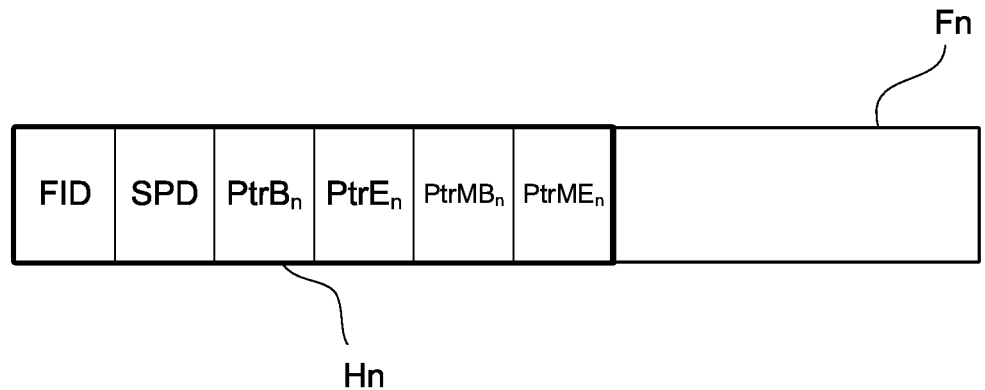
FIG. 3 shows an audio frame and its header, as used by the restitution method implemented by the receiver-recorder device in FIG. 1 according to one particular embodiment.

FIG. 3 shows an audio frame $F_n$ and its header $H_n$, as used by the restitution method implemented by the receiver-recorder device PVR according to a particular non-limiting embodiment of the present disclosure. The header $H_n$ contains an information field FID that makes it possible to identify the rank n of the frame, namely its position in the audio stream S1. The header $H_n$ also contains a field that identifies the desired restitution speed SPD. In addition to an identifier for defining a relationship between the accelerated restitution speed and the nominal speed, this field itself contains a field for defining whether a single accelerated restitution speed is defined at encoding and therefore whether there is only a single set of pointers in the header or there are multiple successive sets of pointers in the header. FIG. 3 illustrates the case in which a single accelerated speed is defined and a single set of pointers defines a series of samples to be omitted and a series of samples to be mixed.

Figure 4:
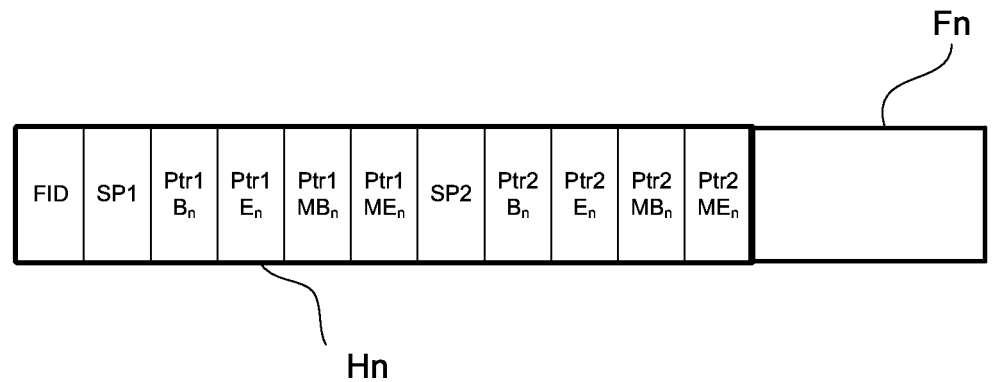
FIG. 4 shows a variant of an audio frame and its header, as used by the encoding and/or restitution method according to one particular embodiment.

FIG. 4 shows a variant of the audio frame Fn and its header Hn as used by the restitution method according to the present disclosure, with two accelerated restitution speeds being supported in the encoding. In this case, the first speed identification field SP1 contains, in addition to information related to a speed ratio between the nominal restitution speed and the first accelerated speed, information indicating that the number of encoded accelerated speeds is two and that the two sets of pointers used for truncating and mixing samples follow in the header. This, in FIG. 4, in the header Hn, the field SP1 announcing two sets of pointers and encoding the restitution speed corresponding to the first set is followed by the first set of pointers Ptr1 Bn, Ptr1 En, Ptr1 MBn, and Ptr1 $ME_n$, respectively, and then a field SP2 announcing the second set of pointers and encoding the corresponding speed, followed by the second set of pointers Ptr2Bn, Ptr2En, Ptr2MBn, and Ptr2MEn. The receiver-recorder device PVR receiving the encoded stream is adapted to select samples according to the restitution speed chosen by the operator, which is either the nominal speed (all of the received samples being restituted) or the speed indicated by the field SP1 or by the field SP2. If the desired restitution speed is SP1, the selection of samples for the restitution of the audio content carried by the stream S1 is carried out using the pointers Ptr1 Bn, Ptr1 En, Ptr1 MBn, and Ptr1 MEn. Similarly, if the desired restitution speed is SP2, the pointers used for the selection of samples are Ptr2Bn, Ptr2En, Ptr2MBn, and Ptr2MEn.

Figure 5:
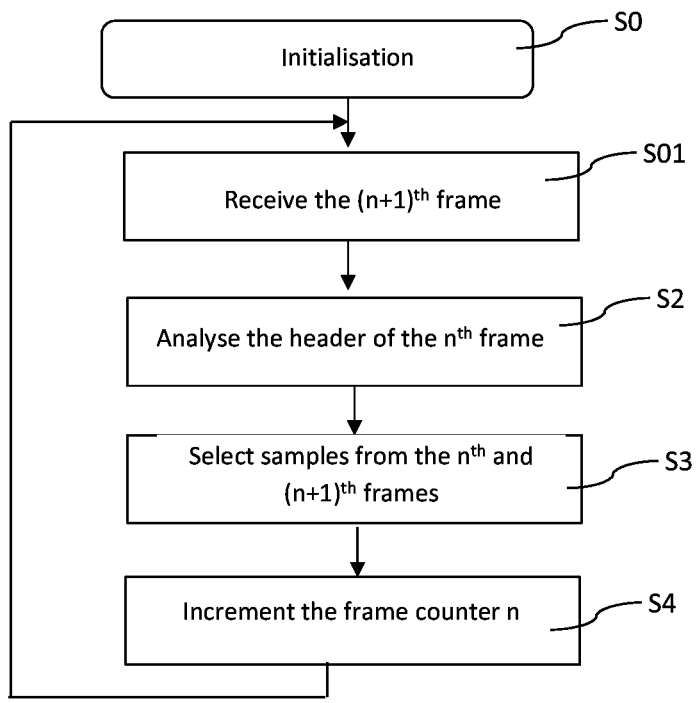
FIG. 5 is a diagram illustrating the steps in selecting samples according to the restitution method of an item of audio content according to one particular embodiment.

FIG. 5 is a diagram illustrating the steps in selecting samples according to the restitution method of an item of audio content according to one particular and non-limiting embodiment the present disclosure.

Step S0 correspond to the initialization of the system, during which the receiver-recorder device PVR is configured in a nominal operating mode in which a user can start viewing audiovisual content previously received from the server S, and encoded by the encoder E. The audiovisual content is stored on a storage unit of the device PVR, such as a hard disk, in the form of a file containing a video stream and an audio stream. The audio stream is the stream 51 shown in FIG. 2.

During step S01, the recorded stream S1 is read from the storage unit of the device PVR and analyzed by the control unit after demultiplexing the incoming stream, specifically to separate the audio and video components.

The successive frames $F_n$ and $F_{n+1}$ of the stream S1 are successively read and analyzed during step S2, and during S3, the control unit selects a subset of the samples $SA_n$ based on the pointers $PtrB_n$, $PtrE_n$, $PtrMB_n$, and $PtrME_n$ read during step S2. The control unit recopies the selected samples to the restitution buffer and writes the result of the mixing operation there when sample mixing is required. During step S4, a frame counter is incremented and the sample selection process is repeated with the following frame, during which, in parallel to the selection process, a restitution process empties the restitution buffer by sending the samples to the restitution module containing an audio decoding module. The restitution buffer is managed by the control unit as a circular buffer. Depending on the embodiment, the header of a frame in rank n uses pointers to indicate the samples to be selected from among those in the frames in rank n and rank n+1. It is therefore necessary, in the particular embodiment illustrated, to have received at least two frames in order to perform a selection and copy, after mixing if necessary, the selected samples to the restitution buffer, in which the series of samples are delimited by the pointers.

In other words and according to the described embodiment, the present disclosure comprises, according to one aspect, an audio content restitution method in the audio program receiver PVR adapted to the restitution of audiovisual content at a nominal restitution speed and at least one restitution speed greater than the nominal restitution speed. The audio content is received encoded in a transport stream S1. With the encoding done by the encoder E, the transport stream S1 containing a succession of frames $F_n$ of audio samples $SA_n$ and of pointer type information PtrMBn, PtrBn, PtrEn, and PtrMEn, on at least a portion of the audio samples of the frames Fn. The restitution method for the stream S1 comprises:

- a selection of audio samples from the frames $F_n$, prior to a restitution operation, the selected audio samples being identified from the pointer type information PtrMBn, PtrBn, PtrEn, and PtrMEn.
- a restitution of the only samples selected and written to the restitution buffer, such that the restitution duration of those samples is less than the restitution duration of the complete frames, in the absence of a selection.

The operation of selecting and writing to the restitution buffer comprises the mixing of audio samples before and after the truncation areas. Thus, the sample from the frame in rank n, whose position is defined by the pointer PtrMBn, is mixed with the sample from the frame in rank n+1, whose position is defined by the pointer PtrEn.

The receiver-recorder PVR is adapted to the restitution of audio content corresponding to the encoded audio stream S1 by implementing the described method of accelerated restitution. Its control unit selects samples to be processed by copying them to the restitution buffer and samples to be mixed, before writing the result of the mixing to the restitution buffer, all while simultaneously reading the restitution buffer in order to restitute the audio stream resulting from the selection and mixing process.

Figure 6:
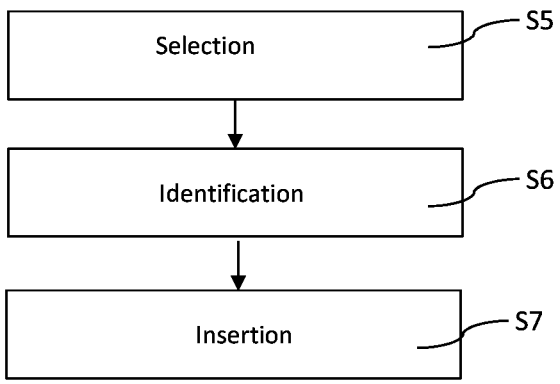
FIG. 6 is a diagram illustrating some steps of the encoding method of an item of audio content according to one particular embodiment.

So that the described processes are possible in the receiver-recorder PVR, the encoder E implements a method of encoding an item of native audio content and creates an audio transport stream, as illustrated in FIG. 6, by inserting S7 a succession of frames of audio samples and the pointer type information on the audio samples. The encoding method uses for instance an algorithm based on the WSOLA method and comprises a selection S5 of samples to be restituted and an identification S6 of the samples to truncate and the samples to mix by pointer type information.

In the illustrated embodiment, the encoder E inserts the pointers on the samples in the header fields of the frames Fn of the audio stream S1, allowing the receiver-recorder PVR then to select only a subset of the audio samples identified from the inserted pointers, in order to implement the accelerated restitution.

The present disclosure also relates to an encoded audio signal in the form of an audio stream containing a succession of frames of audio samples and pointer type information inserted for instance into each of the frames, allowing a receiver of this signal to identify one or more series of audio samples to be truncated and eventually one or more series of audio samples to be mixed, all to be used to carry out an accelerated restitution of the audio signal without distorting the tone, by a receiver.

The present disclosure does not relate only to the embodiment described above, but also relates to any method intended to allow a receiver of audio frames to select only a subset of audio samples based on information inserted into the audio stream by the encoding and to then allow the restitution of audio content in a shorter duration than its nominal duration, (for instance without major altering the audio tone) such that an item of content of a defined duration in the encoding can be restituted in a shorter duration by a reception and restitution device.

According to a variant of the embodiment of the present disclosure, the pointers on the audio samples to be selected are inserted into the audio stream by the encoder E and extracted by the device PVR using a watermarking method.

The invention claimed is:

1. A method of restitution of audio content in a receiver of audio and/or audiovisual content at one of a nominal or accelerated restitution speed, said receiver being adapted to the restitution of said audio content, said audio content being received encoded and containing a succession of frames of audio samples and pointer type information on at least one portion of the audio samples of said frames, said pointer type information identifying at least one first sub-set of audio samples from said frames to be restituted during accelerated restitution, and at least one second sub-set of audio samples from said frames to be truncated during accelerated restitution, wherein said method comprises: during the accelerated restitution, selecting audio samples of said first sub-set to be restituted during accelerated restitution and omitting samples of said second sub-set; and restituting said selected audio samples of said first sub-set.

2. A restitution method according to claim 1, wherein said pointer type information is contained in header packets, each of said header packets being associated with one of said frames.

3. A restitution method according to claim 2, wherein said header packets each contain several sets of pointer type information, each of said sets being respectively associated with one possible value of a restitution speed greater than said nominal restitution speed.

4. A restitution method according to claim 1, wherein said pointer type information contains at least one of information identifying a start of a series of samples to be one of restituted and truncated and information identifying an end of a series of samples to be one of restituted and truncated.

5. A restitution method according to claim 1, wherein said method comprises a mixing of at least one first selected audio sample with at least one second selected audio sample, said at least one first and said at least one second selected audio samples being selected from said at least one first sub-set.

6. A restitution method according to claim 5, wherein said mixing of said first and second selected audio samples is carried out by calculating an average value of said first and second selected audio samples.

7. A restitution method according to claim 5, wherein said pointer type information on the audio samples comprises pointers related to the selected samples to be mixed.

8. A restitution method according to claim 5, wherein said pointer type information identifies audio samples from said frames to be mixed during accelerated restitution and contains at least one of information identifying a start of a series of samples to be mixed and information identifying an end of a series of samples to be mixed.

9. A receiver-decoder of audiovisual and/or audio content comprising at least one processor configured for restitution of an item of audio content at one of a nominal and accelerated restitution speed, said audio content being received encoded and comprising a succession of frames of audio samples and pointer type information on at least a portion of the audio samples of said frames, said pointer type information identifying at least one first sub-set of audio samples from said frames to be restituted during accelerated restitution, and at least one second sub-set of audio samples from said frames to be truncated during accelerated restitution, wherein said at least one processor is configured for selecting audio samples of said at least one first sub-set to be restituted during accelerated restitution, omitting samples of said at least one second sub-set; and restituting, during accelerated restitution, said selected audio samples of said first sub-set.

10. The receiver/decoder according to claim 9, wherein said pointer type information contains at least one of information identifying a start of a series of samples to be one of restituted and truncated and information identifying an end of a series of samples to be one of restituted and truncated.

11. The receiver/decoder according to claim 9, wherein said processor is configured to mix at least one first selected audio sample with at least one second selected audio sample, said at least one first and said at least one second selected audio samples being selected from said at least one first sub-set.

12. The receiver/decoder according to claim 11, wherein said pointer type information on the audio samples comprises pointers related to the selected samples to be mixed.

13. The receiver/decoder according to claim 11, wherein said pointer type information identifies audio samples from said frames to be mixed during accelerated restitution and contains at least one of information identifying a start of a series of samples to be mixed and information identifying an end of a series of samples to be mixed.

14. The receiver/decoder according to claim 9, wherein said pointer type information is contained in header packets, each of said header packets being associated with one of said frames and containing several sets of pointer type information, each of said sets being respectively associated with one possible value of a restitution speed greater than said nominal restitution speed.

15. A method for encoding audio content, said encoded audio content including a succession of frames of audio samples and pointer type information on at least one portion of the audio samples of said succession of frames, said pointer type information identifying at least one first sub-set of audio samples from said frames to be restituted during accelerated restitution, and at least one second sub-set of audio samples from said frames to be truncated during accelerated restitution, wherein said method comprises selecting audio samples of said at least one first sub-set to be restituted during the accelerated restitution, omitting samples of said at least one second sub-set; and identifying the selected audio samples of said at least one first sub-set to be restituted during the accelerated restitution by said pointer type information.

16. A method for encoding audio content according to claim 15, wherein said method uses an algorithm for modifying a succession of audio samples based on a WSOLA method.

17. A non-transitory computer-readable storage medium storing a computer program product comprising program code instructions for executing the restitution method according to claim 1, when said program code instructions are executed by a computer.

18. A non-transitory computer-readable storage medium storing a computer program product comprising program code instructions for executing the encoding method according to claim 15, when said program code instructions are executed by a computer.

19. An encoder of audio and/or audiovisual content, including at least one processor configured for encoding an item of audio content, said encoded audio content including a succession of frames of audio samples and pointer type information on at least one portion of audio samples of said frames, said pointer type information identifying at least one first sub-set of audio samples from said frames to be restituted during accelerated restitution, and at least one second sub-set of audio samples from said frames to be truncated during accelerated restitution, wherein said at least one processor is configured for selecting audio samples of said at least one first sub-set to be restituted during accelerated restitution, identifying samples of said at least one second sub-set to be excluded from restitution by said pointer type information, and identifying said selected audio samples of said at least one first sub-set to be restituted during accelerated restitution by said pointer type information.

20. A non-transitory processor readable medium having stored thereon encoded data including a succession of frames of audio content and pointer type information on at least one portion of the audio samples of said frames, wherein said pointer type information identifies audio samples from said frames to be restituted during an accelerated restitution and said data is encoded according to the method of claim 15.

* * * * *